US009284892B2

(12) United States Patent
Tsukahara

(10) Patent No.: US 9,284,892 B2
(45) Date of Patent: Mar. 15, 2016

(54) SIX-STROKE CYCLE ENGINE HAVING SCAVENGING STROKE

(71) Applicant: YAMAHA HATSUDOKI KABUSHIKI KAISHA, Iwata-shi, Shizuoka (JP)

(72) Inventor: Ei Tsukahara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 80 days.

(21) Appl. No.: 14/374,535

(22) PCT Filed: Jan. 16, 2013

(86) PCT No.: PCT/JP2013/050646
§ 371 (c)(1),
(2) Date: Jul. 25, 2014

(87) PCT Pub. No.: WO2013/111649
PCT Pub. Date: Aug. 1, 2013

(65) Prior Publication Data
US 2015/0040847 A1 Feb. 12, 2015

(30) Foreign Application Priority Data

Jan. 27, 2012 (JP) ................................. 2012-014976

(51) Int. Cl.
F02M 25/07 (2006.01)
F02D 13/02 (2006.01)
(Continued)

(52) U.S. Cl.
CPC .......... F02D 13/0234 (2013.01); F02B 25/145 (2013.01); F02B 75/02 (2013.01);
(Continued)

(58) Field of Classification Search
CPC .............. F02D 13/0234; F02D 13/023; F02D 13/0276; F02D 41/0002; F02D 2041/001; F02B 75/02; F02B 75/021; F02B 25/145; F02B 29/0406; F02B 37/00; F02B 2075/022; Y02T 10/18; Y02T 10/121; F02M 25/0752
USPC .................................................. 123/64, 90.15
See application file for complete search history.

(56) References Cited

U.S. PATENT DOCUMENTS 1,882,970 A * 10/1932 Schimanek .................... 123/1 R
5,197,434 A * 3/1993 Contreras Orellana ....... 123/433
(Continued)

FOREIGN PATENT DOCUMENTS

EP 2 053 214 A1 4/2009
JP 02-096434 U 8/1990
(Continued)

OTHER PUBLICATIONS

Official Communication issued in corresponding European Patent Application No. 13741155.9, mailed on Oct. 30, 2014.
(Continued)

Primary Examiner — Marguerite McMahon
(74) Attorney, Agent, or Firm — Keating and Bennett, LLP

(57) ABSTRACT

A six-stroke cycle engine includes an intake passage including a downstream end connected to a combustion chamber and no throttle valve therein, and an exhaust passage including a catalyst and an upstream end connected to the combustion chamber. The six-stroke cycle engine includes a first valve configured to open and close the intake passage, a second valve configured to open and close the exhaust passage, a valve gear configured to operate the first valve and the second valve so that an intake stroke, a compression stroke, an expansion stroke, and an exhaust stroke are executed, in this order, and to operate only the first valve so that a scavenging intake stroke and a scavenging exhaust stroke are executed, in this order, following the exhaust stroke. The valve gear includes a variable valve mechanism configured to continuously change an opening and closing timing and a lift amount of the first valve.

5 Claims, 7 Drawing Sheets

(51) Int. Cl.
    *F02B 75/02*     (2006.01)
    *F02B 25/14*     (2006.01)
    *F02D 41/00*     (2006.01)
    *F02B 29/04*         (2006.01)
    *F02B 37/00*         (2006.01)

(52) U.S. Cl.
    CPC ........... *F02B 75/021* (2013.01); *F02D 13/023* (2013.01); *F02D 13/0276* (2013.01); *F02D 41/0002* (2013.01); *F02M 25/0752* (2013.01); *F02B 29/0406* (2013.01); *F02B 37/00* (2013.01); *F02B 2075/022* (2013.01); *F02D 2041/001* (2013.01); *Y02T 10/121* (2013.01); *Y02T 10/18* (2013.01)

(56) References Cited

U.S. PATENT DOCUMENTS

| | | | |
|---|---|---|---|
| 7,650,745 B2 * | 1/2010 | Lewis | 60/285 |
| 8,186,334 B2 * | 5/2012 | Ooyama | 123/568.12 |
| 8,978,602 B2 * | 3/2015 | Williams et al. | 123/64 |
| 2002/0120384 A1 | 8/2002 | Takemura et al. | |
| 2004/0123819 A1 | 7/2004 | Ziabazmi | |
| 2004/0134449 A1 | 7/2004 | Yang | |
| 2008/0098969 A1 | 5/2008 | Reed et al. | |
| 2010/0050963 A1 * | 3/2010 | Ooyama | 123/64 |

FOREIGN PATENT DOCUMENTS

| | | |
|---|---|---|
| JP | 02-264120 A | 10/1990 |
| JP | 02-264122 A | 10/1990 |
| JP | 03-030539 U | 3/1991 |
| JP | 2002-256930 A | 9/2002 |
| JP | 2006-250029 A | 9/2006 |
| JP | 2010-209683 A | 9/2010 |
| WO | 2007/129206 A1 | 11/2007 |

OTHER PUBLICATIONS

Official Communication issued in International Patent Application No. PCT/JP2013/050646, mailed on Mar. 5, 2013.

* cited by examiner

SIX-STROKE CYCLE ENGINE HAVING SCAVENGING STROKE

BACKGROUND OF THE INVENTION

1. Field of the Invention

The present invention relates to a six-stroke cycle engine that includes a scavenging stroke and executes an intake stroke, a compression stroke, an expansion stroke, an exhaust stroke, a scavenging intake stroke, and a scavenging exhaust stroke, in this order.

2. Description of the Related Art

As an engine capable of lowering a cylinder temperature, there is conventionally known a six-stroke cycle engine including a scavenging stroke (scavenging intake stroke and scavenging exhaust stroke) after an exhaust stroke. "Scavenging" of the scavenging stroke means an operation of replacing the gas in the cylinder. In this specification, the scavenging intake stroke indicates a stroke of supplying air into the cylinder to replace the gas in the cylinder. The scavenging exhaust stroke indicates a stroke of discharging air from the cylinder to replace the gas in the cylinder.

In a conventional six-stroke cycle engine, when fresh air is supplied into the cylinder in the scavenging intake stroke, the wall surface of the cylinder is cooled, and the temperature of the cylinder is lowered. When the temperature of the cylinder is lowered, the compression ratio can be made high, and the fuel efficiency or output can be improved. In addition, the ignition timing can be advanced, and the output at the time of high speed rotation can be improved. Furthermore, since the fresh air remains in the cylinder after the scavenging exhaust stroke, the intake volumetric efficiency can be improved in the next intake stroke.

In the six-stroke cycle engine of this type, however, since fresh air is discharged to the exhaust passage in the scavenging exhaust stroke, the following problems arise. More specifically, an oxygen density detected by an $O_2$ sensor provided in the exhaust passage greatly increases, and thus correct execution of air-fuel ratio control becomes impossible. In addition, since a large quantity of oxygen is supplied to the catalyst provided in the exhaust passage, oxidation reaction excessively occurs in the catalyst. Hence, the temperature of the catalyst abruptly rises, and NOx cannot be reduced.

To solve these problems, an arrangement for returning air in the cylinder to an intake passage in the scavenging exhaust stroke, as described in, for example, Japanese Patent Laid-Open No. 2010-209683, may be used.

A six-stroke cycle engine disclosed in Japanese Patent Laid-Open No. 2010-209683 includes a scavenging passage that communicates a combustion chamber with an intake passage, and a scavenging valve that opens and closes the scavenging passage. In this six-stroke cycle engine, an intake valve opens to supply fresh air into the cylinder in the scavenging intake stroke, and the scavenging valve opens to discharge the air in the cylinder to the intake passage in the scavenging exhaust stroke. That is, in this six-stroke cycle engine, since no fresh air is discharged to the exhaust passage in the scavenging exhaust stroke, the above-described problems do not arise.

SUMMARY OF THE INVENTION

In the six-stroke cycle engine disclosed in Japanese Patent Laid-Open No. 2010-209683, however, since the intake valve opens to pass intake air through a throttle valve in the scavenging intake stroke, pumping loss cannot be reduced.

Preferred embodiments of the present invention have been conceived to solve the above-described problems, and provide a six-stroke cycle engine configured to reduce pumping loss while preventing fresh air from being discharged to an exhaust passage in the scavenging exhaust stroke.

According to a preferred embodiment of the present invention, a six-stroke cycle engine including a scavenging stroke includes an intake passage including a downstream end connected to a combustion chamber and no throttle valve therein; an exhaust passage including a catalyst and an upstream end connected to the combustion chamber; a first valve configured to open and close the intake passage; a second valve configured to open and close the exhaust passage; and a valve gear configured to operate the first valve and the second valve so that an intake stroke, a compression stroke, an expansion stroke, and an exhaust stroke are executed, in this order, and to operate only the first valve so that a scavenging intake stroke and a scavenging exhaust stroke are executed, in this order, following the exhaust stroke, wherein the valve gear includes a variable valve mechanism configured to continuously change an opening and closing timing and a lift amount of the first valve, and to control an intake air volume during the intake stroke.

In the six-stroke cycle engine according to a preferred embodiment of the present invention, the first valve substantially functions as a throttle valve by the variable valve mechanism. For this reason, the intake passage does not need a throttle valve and therefore is configured to decrease the resistance of the air flow therein. In the six-stroke cycle engine, when the first valve opens in the scavenging intake stroke and the scavenging exhaust stroke, fresh air is supplied into the cylinder from the intake passage which has a small air flow resistance.

For this reason, the six-stroke cycle engine reduces pumping loss in the scavenging intake stroke. In the scavenging exhaust stroke, the air in the cylinder is returned to the intake passage.

Hence, according to a preferred embodiment of the present invention, it is possible to provide a six-stroke cycle engine configured to reduce pumping loss while preventing fresh air from being discharged to an exhaust passage in the scavenging exhaust stroke.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A six-stroke cycle engine including a scavenging stroke according to a preferred embodiment of the present invention will now be described in detail with reference to FIGS. 1 and 2.

Figure 1:
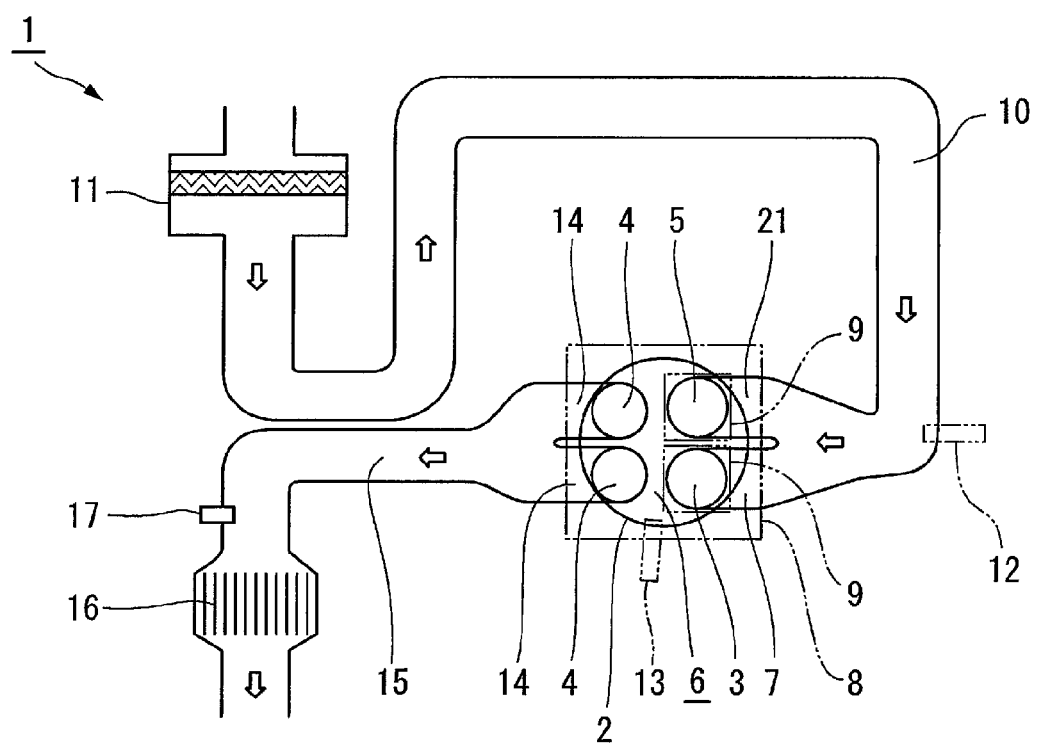
FIG. 1 is a block diagram showing the arrangement of a six-stroke cycle engine according to a first preferred embodiment of the present invention.

A six-stroke cycle engine 1 shown in FIG. 1 includes an intake valve 3, exhaust valves 4, and a scavenging valve 5 in one cylinder 2. FIG. 1 illustrates only one cylinder 2. However, preferred embodiments of the present invention are applicable not only to a single cylinder engine but also to a multiple cylinder engine. In the present preferred embodiment, the intake valve 3 and the scavenging valve 5 correspond to a "first valve." In the present preferred embodiment, the exhaust valve 4 corresponds to a "second valve."

The intake valve 3 opens and closes an intake port 7 that opens to a combustion chamber 6. One intake valve 3 is provided for one cylinder 2. The intake valve 3 operates by driving a variable valve mechanism 9 of a valve gear 8 (to be described below). The intake port 7 defines the downstream end of an intake passage 10. The upstream end of the intake passage 10 opens to the atmosphere via an air cleaner 11. No throttle valve is provided in the intake passage 10. The fuel of the six-stroke cycle engine 1 is supplied by an intake passage injector 12 provided on a downstream portion of the intake passage 10, or a cylinder injector 13 provided on a side of the cylinder 2.

The exhaust valves 4 open and close exhaust ports 14 that open to the combustion chamber 6. Two exhaust valves 4 are provided for one cylinder 2. The exhaust valves 4 operate by driving of the valve gear 8 (to be described below). The exhaust ports 14 define the upstream end of an exhaust passage 15. A catalyst 16 is located in the exhaust passage 15. The catalyst 16 is preferably a so-called three-way catalyst, for example. An A/F sensor 17 configured to detect the oxygen density in the exhaust passage 15 is provided on upstream of the catalyst 16 in the exhaust passage 15.

The scavenging valve 5 opens and closes a scavenging port 21 that opens to the combustion chamber 6. The scavenging port 21 defines the downstream end of the intake passage 10 together with the intake port 7.

The scavenging valve 5 is located at a position adjacent to the intake valve 3 in the axial direction (up/down direction in FIG. 1) of a crankshaft (not shown). The scavenging valve 5 operates by driving the variable valve mechanism 9 of the valve gear 8 (to be described below).

The valve gear 8 converts the rotation of a camshaft into a reciprocating motion by a cam and transmits it to the valves, although details thereof are not illustrated. The valve gear 8 includes the variable valve mechanism 9 between the camshaft and each of the intake valve 3 and the scavenging valve 5. The variable valve mechanisms 9 is configured to continuously change the opening and closing timings and lift amounts of the intake valve 3 and the scavenging valve 5, respectively. The variable valve mechanism 9 is preferably implemented by, for example, a structure including a movable gearing member between the camshaft and a rocker arm.

Figure 2:
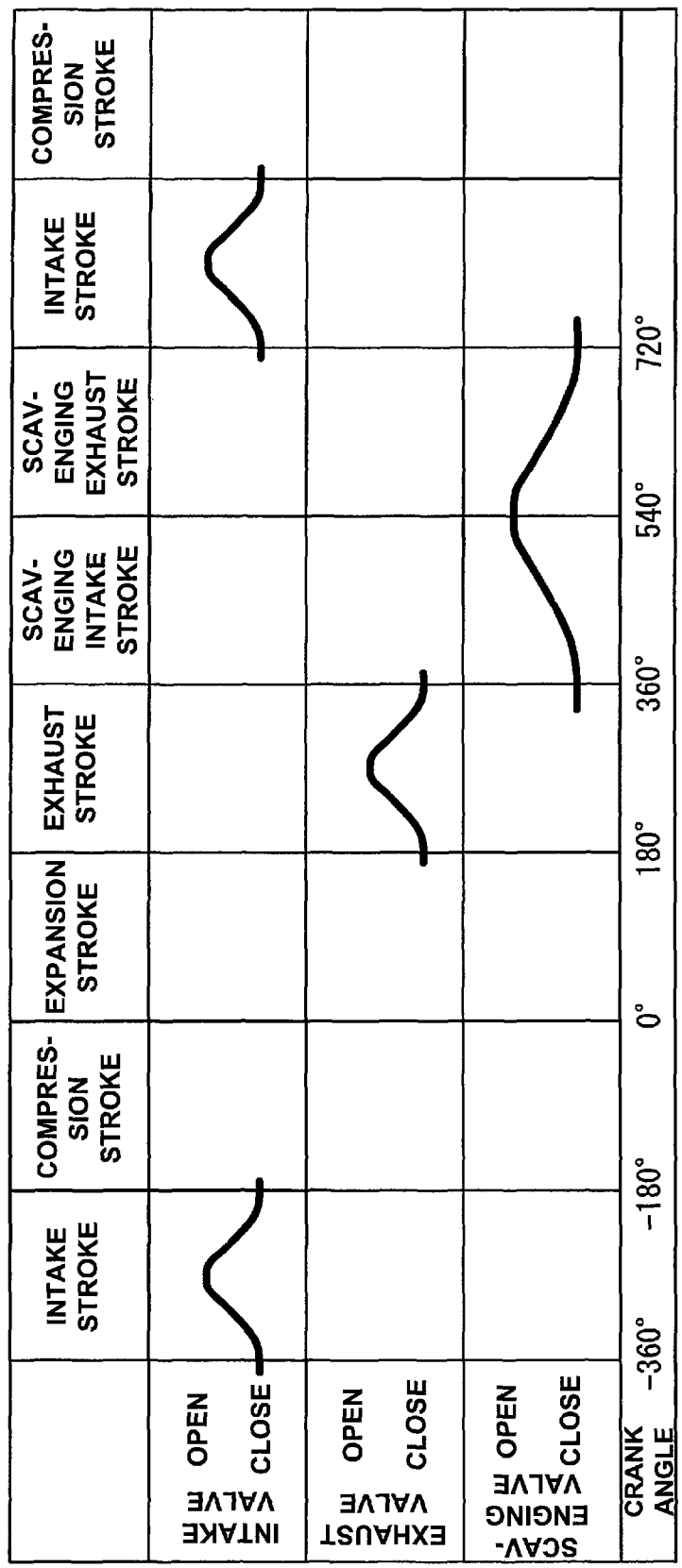
FIG. 2 is a timing chart showing valve opening and closing timings.

The valve gear 8 operates the valves so as to sequentially execute six strokes (to be described below) as shown in FIG. 2. The six strokes are an intake stroke, a compression stroke, an expansion stroke, an exhaust stroke, a scavenging intake stroke, and a scavenging exhaust stroke.

In the intake stroke, the valve gear 8 opens and closes only the intake valve 3 using the variable valve mechanism 9 so as to obtain a predetermined intake air volume. The intake air volume is preferably set based on, for example, the manipulation amount of an accelerator pedal (not shown). After the compression stroke and the expansion stroke are performed after the intake stroke, the valve gear 8 opens and closes only the exhaust valves 4 in the exhaust stroke. In the scavenging intake stroke and the scavenging exhaust stroke following the exhaust stroke, the valve gear 8 opens and closes only the scavenging valve 5 using the variable valve mechanism 9. As shown in FIG. 2, the scavenging valve 5 opens at an early stage of the scavenging intake stroke and maintains the open state throughout the scavenging intake stroke and the scavenging exhaust stroke. The scavenging valve 5 closes when the scavenging exhaust stroke ends.

More specifically, the valve gear 8 operates the intake valve 3 and the exhaust valves 4 so as to execute the intake stroke, the compression stroke, the expansion stroke, and the exhaust stroke, in this order, in a state in which the scavenging valve 5 is closed. In addition, the valve gear 8 operates only the scavenging valve 5 in a state in which the intake valve 3 and the exhaust valves 4 are closed so as to execute the scavenging intake stroke and the scavenging exhaust stroke, in this order, following the exhaust stroke.

In the thus configured six-stroke cycle engine 1 including the scavenging stroke, the scavenging valve 5 opens in the scavenging intake stroke, and fresh air is inhaled from the intake passage 10 into the cylinder 2 via the scavenging port 21. The resistance generated when air flows through the intake passage 10 is much smaller than in a case in which a throttle valve is provided. For this reason, the six-stroke cycle engine 1 reduces pumping loss in the scavenging intake stroke.

In the scavenging exhaust stroke, the air in the cylinder 2 is returned to the intake passage 10 via the scavenging port 21. For this reason, the fresh air is not discharged to the exhaust passage 15 in the scavenging exhaust stroke.

Hence, according to the present preferred embodiment, it is possible to provide a six-stroke cycle engine configured to reduce pumping loss while preventing fresh air from being discharged to the exhaust passage 15 in the scavenging exhaust stroke.

In the six-stroke cycle engine 1 including the scavenging stroke, the cylinder 2 is cooled during the scavenging stroke. For this reason, the compression ratio is preferably made high, the ignition timing is preferably advanced at the time of high speed rotation, and the intake volumetric efficiency is preferably raised. It is therefore possible to improve the fuel efficiency and output. In addition, since no throttle valve is provided in the intake passage 10, the six-stroke cycle engine 1 reduces pumping loss even in the intake stroke.

According to the present preferred embodiment, since the six-stroke cycle engine 1 including these effects reduces pumping loss in the scavenging stroke, as described above, the output is further improved, and the fuel consumption is reduced.

The scavenging valve 5 according to the present preferred embodiment is provided at a position adjacent to the intake valve 3 in the axial direction of the crankshaft. For this reason, the scavenging port 21 preferably has the same shape as the intake port 7. The exhaust side of the cylinder 2 is not restricted by the scavenging port 21. That is, the six-stroke cycle engine 1 according to the present preferred embodiment preferably is implemented only by changing the valve mechanism of an existing four-stroke engine, and is therefore easily manufactured.

Second Preferred Embodiment

Figure 3:
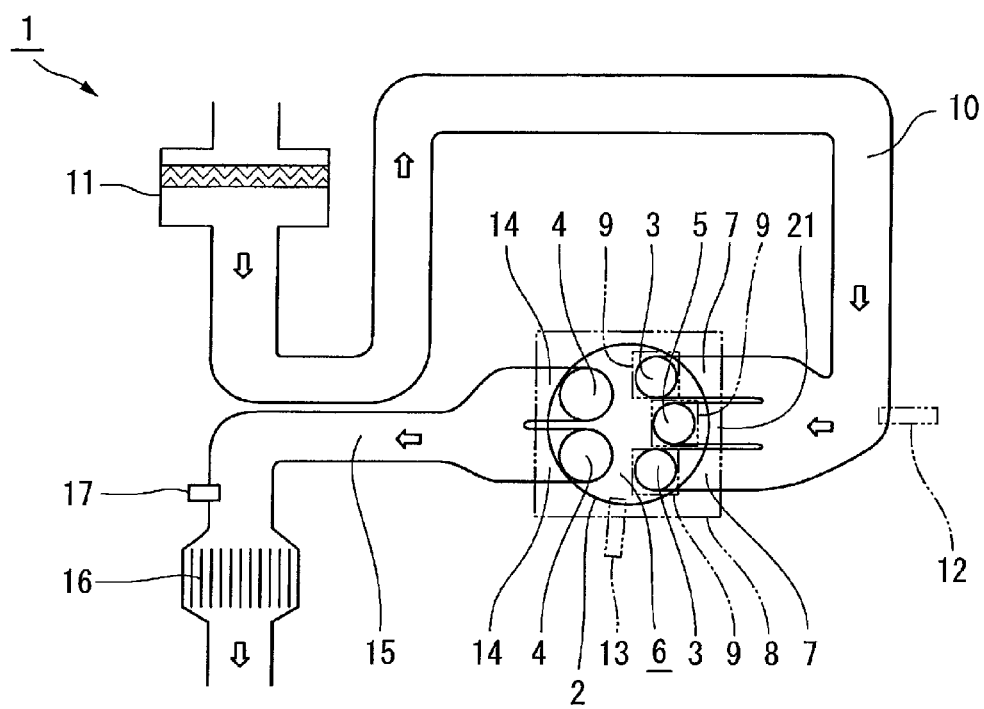
FIG. 3 is a block diagram showing a six-stroke cycle engine according to a second preferred embodiment of the present invention.

An intake valve of a six-stroke cycle engine according to a second preferred embodiment of the present invention preferably is configured as shown in FIG. 3. The same reference numerals as described with reference to FIGS. 1 and 2 denote the same or similar elements in FIG. 3, and a detailed description thereof will appropriately be omitted.

A six-stroke cycle engine 1 shown in FIG. 3 includes two intake valves 3. The intake valves 3 are provided on both sides of a scavenging valve 5. Each intake valve 3 is opened and closed by driving a variable valve mechanism 9.

When the arrangement using the two intake valves 3 is used, as shown in FIG. 3, the intake air volume increases. It is therefore possible to further improve the output.

Third Preferred Embodiment

Figure 4:
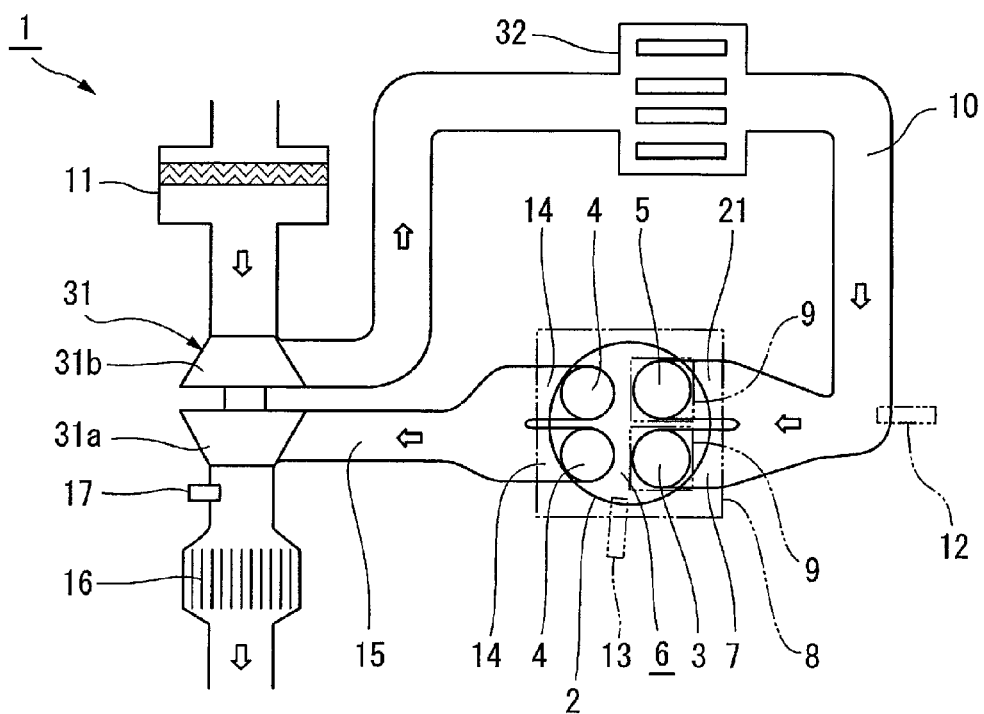
FIG. 4 is a block diagram showing a six-stroke cycle engine according to the third preferred embodiment of the present invention.
Figure 5:
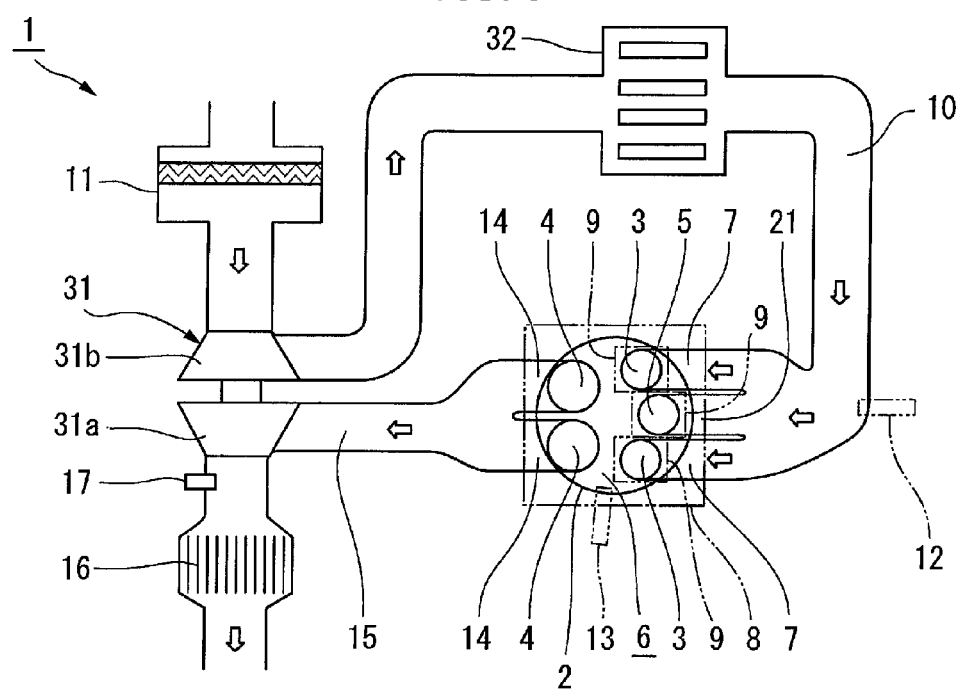
FIG. 5 is a block diagram showing another example of the six-stroke cycle engine according to the third preferred embodiment of the present invention.

According to a third preferred embodiment of the present invention, a six-stroke cycle engine including a scavenging stroke preferably also includes a supercharger, as shown in FIGS. 4 and 5. The same reference numerals as described with reference to FIGS. 1 to 3 denote the same or similar elements in FIGS. 4 and 5, and a detailed description thereof will appropriately be omitted.

The six-stroke cycle engine 1 shown in FIG. 4 includes a supercharger 31 in the six-stroke cycle engine 1 shown in FIG. 1. The six-stroke cycle engine 1 shown in FIG. 5 includes a supercharger 31 in the six-stroke cycle engine 1 shown in FIG. 3. The supercharger 31 according to the present preferred embodiment preferably includes a turbocharger including a turbine 31a on the side of an exhaust passage 15, and a compressor 31b on the side of an intake passage 10. The intake passage 10 according to the present preferred embodiment includes an intercooler 32. The intercooler 32 cools intake air.

According to the preferred embodiments shown in FIGS. 4 and 5, since the supercharger 31 supercharges the intake air, it is possible to provide a six-stroke cycle engine configured to obtain a higher output.

Fourth Preferred Embodiment

A fourth preferred embodiment of a six-stroke cycle engine including a scavenging stroke will be described in detail with reference to FIGS. 6 and 7. The same reference numerals as described with reference to FIGS. 1 and 2 denote the same or similar elements in FIGS. 6 and 7, and a detailed description thereof will appropriately be omitted.

Figure 6:
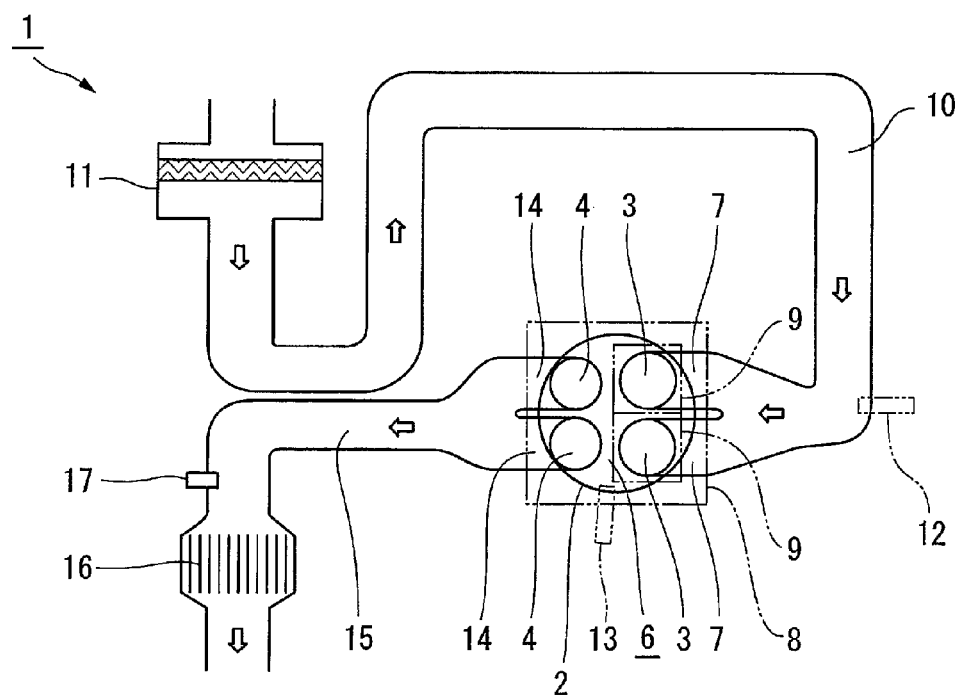
FIG. 6 is a block diagram showing the arrangement of a six-stroke cycle engine according to a fourth preferred embodiment of the present invention.

A cylinder 2 of a six-stroke cycle engine 1 shown in FIG. 6 includes two intake valves 3 and two exhaust valves 4. The six-stroke cycle engine 1 according to the present preferred embodiment includes no scavenging valve. In the present preferred embodiment, the intake valve 3 corresponds to a "first valve." In the present preferred embodiment, the exhaust valve 4 corresponds to a "second valve."

Figure 7:
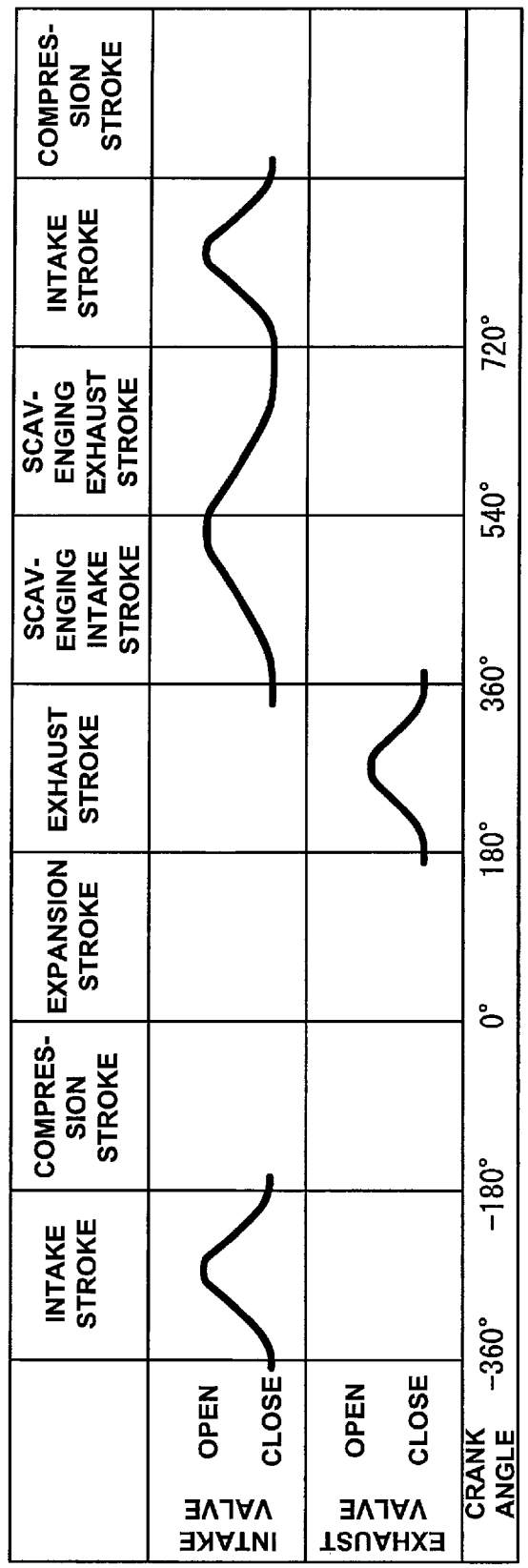
FIG. 7 is a timing chart showing the valve opening and closing timings of the six-stroke cycle engine according to the fourth preferred embodiment.

A valve gear 8 according to the present preferred embodiment is configured to operate the intake valves 3 in the intake stroke, the scavenging intake stroke, and the scavenging exhaust stroke using variable valve mechanisms 9, as shown in FIG. 7. The variable valve mechanisms 9 are configured to continuously change the opening and closing timings and lift amounts of the intake valves 3 so as to obtain a predetermined intake air volume in the intake stroke. The intake air volume is preferably set based on, for example, the manipulation amount of an accelerator pedal (not shown). The variable valve mechanisms 9 open the intake valves 3 at an early stage of the scavenging intake stroke and keep them in the open state throughout the scavenging intake stroke and the scavenging exhaust stroke. The variable valve mechanisms 9 close the intake valves 3 when the scavenging exhaust stroke ends.

More specifically, the variable valve mechanisms 9 drive the intake valves 3 in the intake stroke so as to control the intake air volume, and open the intake valves 3 in the scavenging intake stroke and the scavenging exhaust stroke so as to supply fresh air into a combustion chamber 6 and then discharge the air to an intake port 7.

In the thus configured six-stroke cycle engine 1 including the scavenging stroke, the two intake valves 3 open in the scavenging intake stroke by driving the variable valve mechanisms 9, and fresh air is inhaled from an intake passage 10 into the cylinder 2 via the intake port 7. The resistance generated when air flows through the intake passage 10 is much smaller than in a case where a throttle valve is provided. For this reason, the six-stroke cycle engine 1 reduces pumping loss in the scavenging intake stroke.

In the scavenging exhaust stroke, the air in the cylinder 2 is returned to the intake passage 10 via the intake port 7. For this reason, the fresh air is not discharged to an exhaust passage 15 in the scavenging exhaust stroke.

Hence, according to the present preferred embodiment, it is possible to provide a six-stroke cycle engine configured to reduce pumping loss while preventing fresh air from being discharged to the exhaust passage 15 in the scavenging exhaust stroke.

In the six-stroke cycle engine 1 including the scavenging stroke, the cylinder 2 is cooled in the scavenging stroke. For this reason, the compression ratio is preferably made high, the ignition timing is preferably advanced at the time of high speed rotation, and the intake volumetric efficiency is preferably raised. It is therefore possible to improve the fuel efficiency and output. In addition, since no throttle valve is provided in the intake passage 10, the six-stroke cycle engine 1 reduces pumping loss even in the intake stroke. Furthermore, the six-stroke cycle engine 1 performs intake by the two intake valves 3 during the intake stroke.

According to the present preferred embodiment, since the six-stroke cycle engine 1 including these effects reduces pumping loss in the scavenging stroke, as described above, the output and fuel efficiency is further improved.

In addition, the six-stroke cycle engine 1 according to the present preferred embodiment is preferably implemented only by changing the valve gear of an existing four-stroke engine, and is therefore easily manufactured.

Fifth Preferred Embodiment

Figure 8:
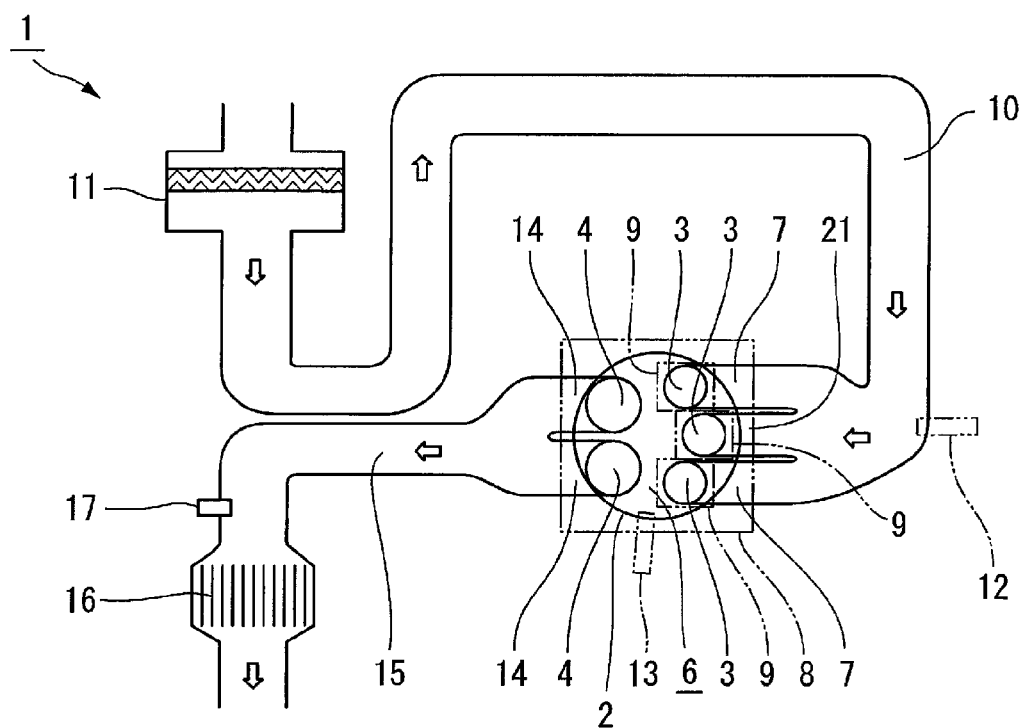
FIG. 8 is a block diagram showing a six-stroke cycle engine according to a fifth preferred embodiment of the present invention.

An intake valve of a six-stroke cycle engine including a scavenging stroke according to a fifth preferred embodiment of the present invention is shown in FIG. 8. The same reference numerals as described with reference to FIGS. 1 to 3 and 6 denote the same or similar elements in FIG. 8, and a detailed description thereof will appropriately be omitted.

A six-stroke cycle engine 1 shown in FIG. 8 includes three intake valves 3. Each intake valve 3 is opened and closed by driving a variable valve mechanism 9. When the arrangement using the three intake valves 3 is used, as shown in FIG. 8, the intake air volume further increases. It is therefore possible to further improve the output.

Sixth Preferred Embodiment

Figure 9:
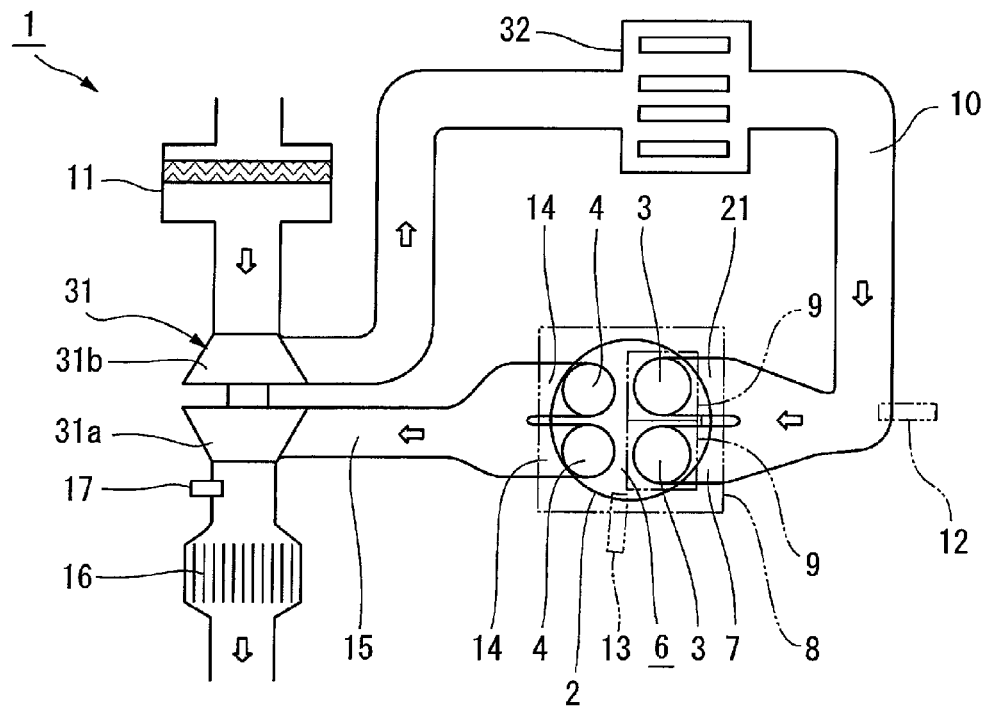
FIG. 9 is a block diagram showing a six-stroke cycle engine according to a sixth preferred embodiment of the present invention.
Figure 10:
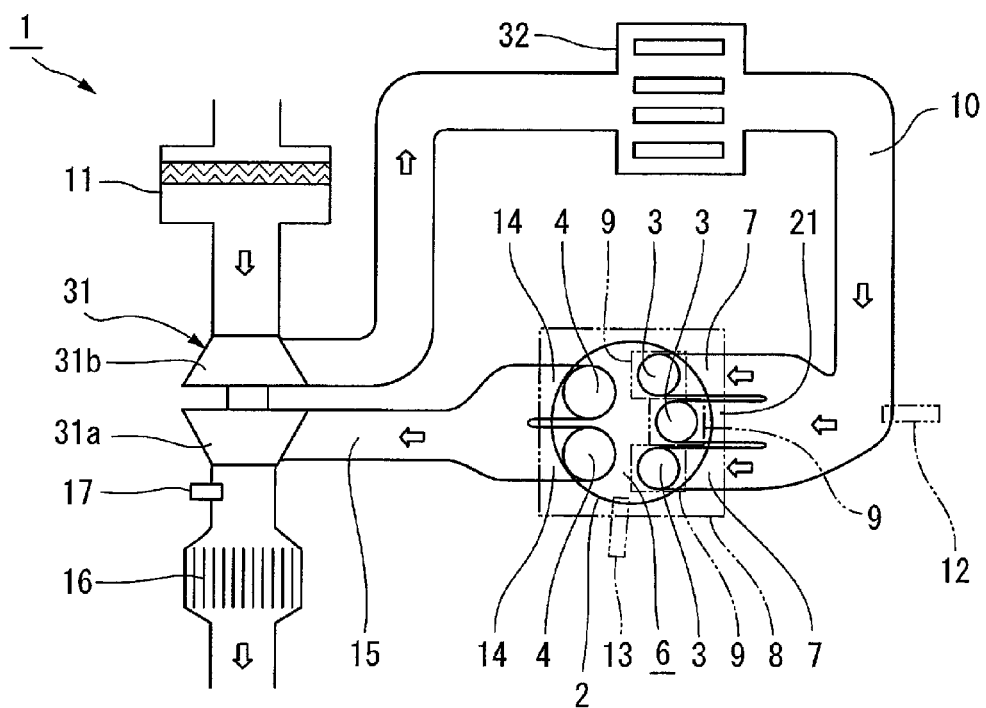
FIG. 10 is a block diagram showing another example of the six-stroke cycle engine according to the sixth preferred embodiment of the present invention.

A six-stroke cycle engine including a scavenging stroke according to a sixth preferred embodiment of the present invention preferably includes a supercharger, as shown in FIGS. 9 and 10. The same reference numerals as described with reference to FIGS. 1 to 8 denote the same or similar elements in FIGS. 9 and 10, and a detailed description thereof will appropriately be omitted.

The six-stroke cycle engine 1 shown in FIG. 9 is configured by providing a supercharger 31 to the six-stroke cycle engine 1 shown in FIG. 6. The six-stroke cycle engine 1 shown in FIG. 10 is configured by providing the supercharger 31 in the six-stroke cycle engine 1 shown in FIG. 8. An intake passage 10 according to the present preferred embodiment includes an intercooler 32 configured to cool intake air.

According to the present preferred embodiment, since the supercharger 31 supercharges the intake air, it is possible to provide a six-stroke cycle engine 1 that obtains a higher output.

When the present preferred embodiment is used, since fresh air cooled by the intercooler 32 is supplied into the cylinder 2 in the scavenging intake stroke, a large cylinder cooling effect is obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A six-stroke cycle engine including a scavenging stroke, comprising:
   an intake passage including a downstream end connected to a combustion chamber and having no throttle valve therein;
   an exhaust passage including a catalyst and an upstream end connected to the combustion chamber;
   a first valve configured to open and close the intake passage;
   a second valve configured to open and close the exhaust passage; and
   a valve gear configured to operate the first valve and the second valve so that an intake stroke, a compression stroke, an expansion stroke, and an exhaust stroke are executed, in this order, and to operate only the first valve so that a scavenging intake stroke and a scavenging exhaust stroke are executed, in this order, following the exhaust stroke; wherein
   the valve gear includes a variable valve mechanism configured to continuously change an opening and closing timing and a lift amount of the first valve; and
   the variable valve mechanism is configured to control an intake air volume during the intake stroke.

2. The six-stroke cycle engine including a scavenging stroke according to claim 1, wherein
   the downstream end of the intake passage includes an intake port and a scavenging port that are open to the combustion chamber;
   the first valve includes an intake valve configured to open and close the intake port, and a scavenging valve configured to open and close the scavenging port;
   the valve gear is configured to operate the intake valve and the second valve so that the intake stroke, the compression stroke, the expansion stroke, and the exhaust stroke are executed, and to operate only the scavenging valve in a state in which the intake valve and the second valve are closed so that the scavenging intake stroke and the scavenging exhaust stroke are executed; and
   the variable valve mechanism is configured to control the intake air volume using the intake valve.

3. The six-stroke cycle engine including a scavenging stroke according to claim 2, wherein the intake passage is configured to supply fresh air from a supercharger, and includes an intercooler.

4. The six-stroke cycle engine including a scavenging stroke according to claim 1, wherein
   the downstream end of the intake passage includes an intake port that opens to the combustion chamber;
   the first valve includes an intake valve configured to open and close the intake port;
   the valve gear is configured to operate the intake valve and the second valve to execute the intake stroke, the compression stroke, the expansion stroke, and the exhaust stroke, and to operate only the intake valve in a state in which the second valve is closed to execute the scavenging intake stroke and the scavenging exhaust stroke; and
   the variable valve mechanism is configured to control the intake air volume using the intake valve, and to open the intake valve in the scavenging intake stroke and the scavenging exhaust stroke to supply fresh air into the combustion chamber and then discharge the fresh air to the intake port.

5. The six-stroke cycle engine including a scavenging stroke according to claim 4, wherein the intake passage is configured to receive fresh air from a supercharger, and includes an intercooler.

* * * * *